Dec. 27, 1938.   J. H. MANN, JR   2,141,542
TIRE INFLATING DEVICE
Filed Aug. 7, 1935   2 Sheets—Sheet 1

Inventor
J. Hervey Mann, Jr
By Robert H. Young
Attorney

Dec. 27, 1938.   J. H. MANN, JR   2,141,542
TIRE INFLATING DEVICE
Filed Aug. 7, 1935   2 Sheets-Sheet 2
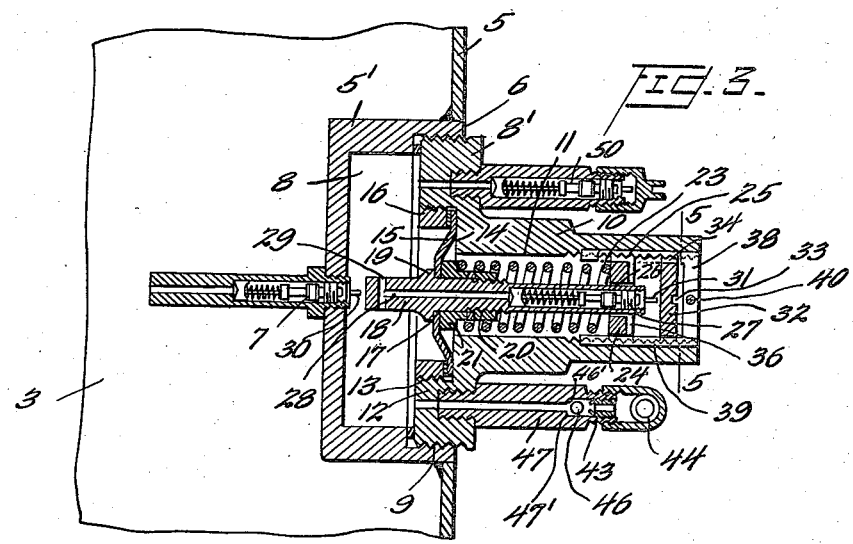

Patented Dec. 27, 1938

2,141,542

UNITED STATES PATENT OFFICE 2,141,542

TIRE INFLATING DEVICE

James Hervey Mann, Jr., St. Petersburg, Fla., assignor to Tire Pressure Control, Inc., a corporation of Florida Application August 7, 1935, Serial No. 35,172

8 Claims. (Cl. 152—418)

My invention relates to improvement in tire inflating devices.

The object of my invention is to provide a tank for each wheel adapted to supply air to the tire carried thereby and maintain any desired pressure in the tire at all times.

Another object of my invention is to provide means whereby the tire may not be over inflated regardless of the amount of air pressure in the supply tank, at the same time providing automatic means for shutting off the air to the tire in the event of a blow-out, and thus prevent exhausting the air in the supply tank.

A further object of my invention is to provide a device of this character which may be readily made a part of the wheel and in no way disfigures the wheel, the same maintaining the same general appearance of the ordinary metal wheel now in use.

A still further object of the invention is to provide an apparatus of this character in which the air in the tire as well as the air in the supply tank may be readily tested independently of each other.

A still further object of the invention is to provide a simple, cheap and effective structure to accomplish the heretofore stated results and having certain details of structure and combination of parts hereinafter more fully set forth.

A still further object of my invention is to provide automatic means whereby the escape of air from the tire is prevented in the event the air pressure in the tank or control should for any reason fall below that of the tire.

In the accompanying drawings:

Figure 3 is an enlarged longitudinal sectional view, taken on the line 3—3 Figure 1;

Figure 4 is an end view of Figure 3;

Figure 5 is a transverse sectional view, taken on the line 5—5 of Figure 3;

Figure 6 is a perspective view of the pressure adjustment nut;

Figure 7 is a perspective view of the relief valve adjusting nut; and

Figure 8 is a perspective view of the locking key for the pressure adjusting nut and the relief valve adjusting nut.

Figure 1:
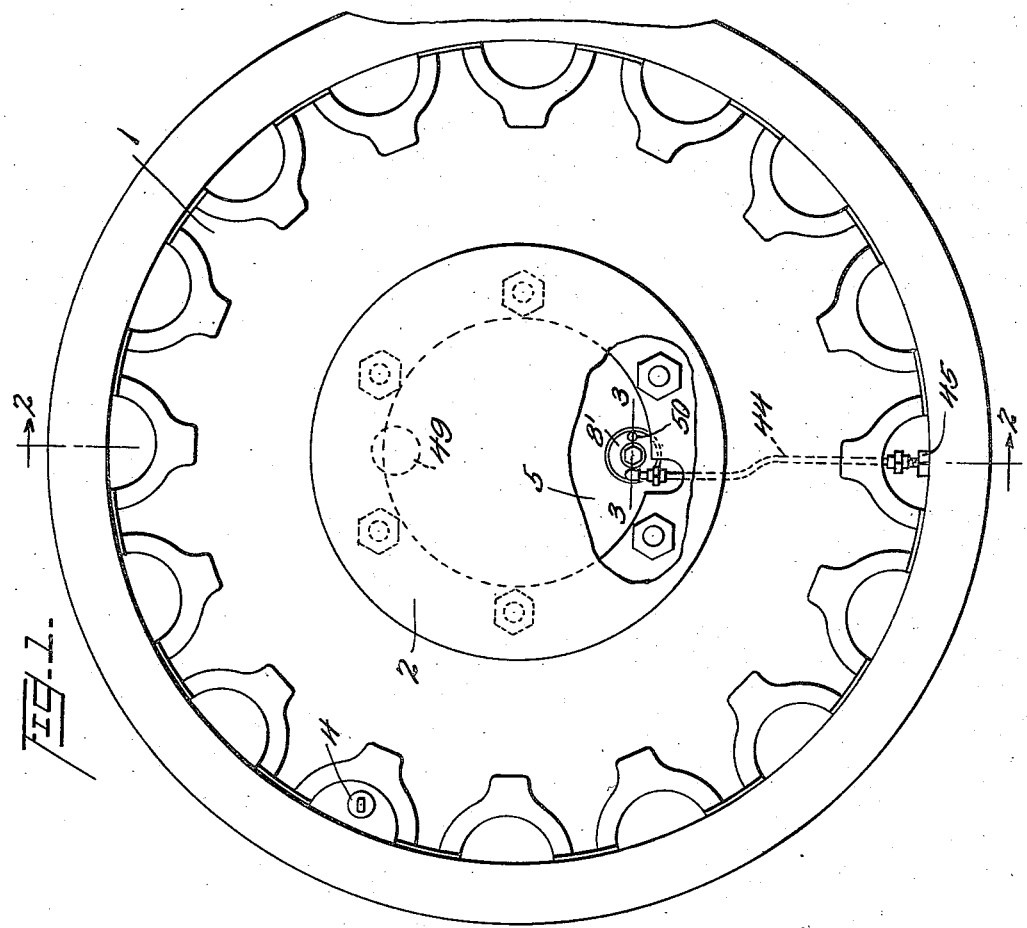
Figure 1 is a side view of a disk or metal wheel, partly broken away, showing the application of my invention thereto.
Figure 2:
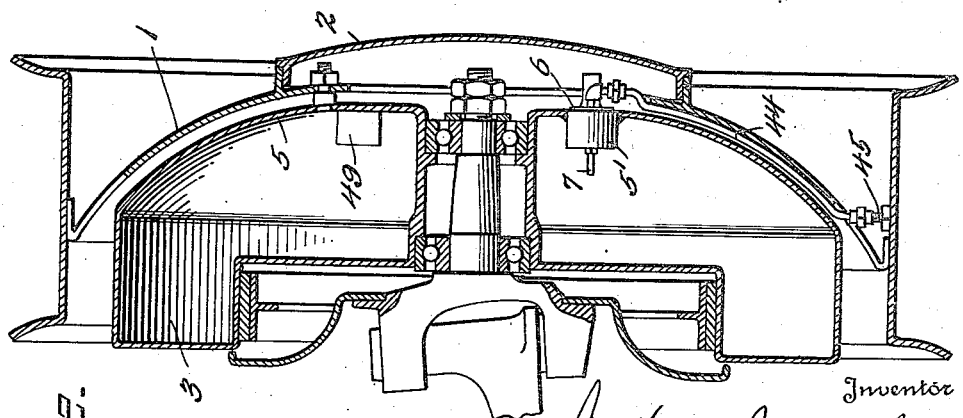
Figure 2 is an enlarged horizontal transverse sectional view, taken on the line 2—2 Figure 1.

Referring now to the drawings, 1 represents the ordinary metal or disk wheel which carries the enlarged cap 2, so that the wheel may be readily removed, as is well understood by those skilled in the art. The disk wheel has arranged on or adjacent its inner face a tank 3, which may be supported in any desired manner, but, as shown, could surround or form the brake drum of the wheel. This tank opposite the cap is provided with a Schrader type valve 4, so that the same may be supplied with air and any pressure desired obtained therein from the ordinary airpump at a service station.

The front wall 5 of the tank opposite the cap 2 has secured therein a cylindrical housing 5' of metal, and has an air-tight connection with the tank, its outer open end 6 being beyond the tank. The bottom or inner wall of said cylindrical housing has screwed, or otherwise secured therein, a Schrader type valve 7, the inner end of which communicates with the tank and the outer end with the space 8 in the housing, or what will hereinafter be called the auxiliary air tank. The outer end of the housing 5' is closed by the cap 8', and has a screw-threaded connection 9, so that it may be readily removed therefrom. The cap 8' has formed integral therewith an outwardly extending barrel-like extension 10, which has a bore 11 therethrough and communicates with the space or auxiliary tank 8. Surrounding the inner end of said bore is an annular cutaway portion 12, having its outer wall 13 screwthreaded. Fitting against the shoulder 14, formed by the cutaway portion 12, is a diaphragm 15, preferably made of heavy rubber, and is clamped against the shoulder 14 by means of the externally threaded nut 16 screwed into the threads of the outer wall 13.

The diaphragm 15 has a central opening 17 therein, through which passes the cylindrical valve carrying member 18, which has its inner end extending some distance into the space 8. The member 18 has an annular flange 19 which engages the inner face of the diaphragm and limits the outward movement thereof on the diaphragm. The member 18 is externally screwthreaded, as indicated at 20, and has screwed thereon a nut 21 which clamps the diaphragm 15 against the flange 19, so that the member 18 is securely locked to the diaphragm and this member is supported by the diaphragm. The nut 21 has an outwardly extending sleeve 22, for a purpose later to be described. The cylindrical member 18 extends some distance outwardly into the cylindrical extension 10 of the cap. Surrounding said extension is a coil spring 23, with its inner end engaging the nut 21, and thereby exerts an inner pressure thereon to normally hold the diaphragm inwardly. The outer end of the coil spring engages the pressure adjustment nut 24, which is internally threaded in the extension of the cap, as indicated at 25, so that the tension of the spring may be regulated, for a purpose later to be described.

The cylindrical member 18 has a bore 26 extending from its outer end inwardly and has screwed therein a Schrader type valve 27. The rear end of the bore is contracted, as indicated at 28, and extends nearly to the end of the member 18 and communicates with the transverse passage 29 and the space or auxiliary tank 8. This forms a flat inner end which is in direct alinement with the stem 30 of the Schrader type valve 7, as clearly shown in Figure 3 of the drawings.

The valve stem 30 of the Schrader type valve 27 extends beyond the end of the member 18, as shown in Figure 3. Screwed into the extension of the cap 8 is a pressure adjustment nut 32, which may be adjusted to or from the valve stem. This pressure adjustment nut 32 is provided with a kerf 33 in its outer face for the reception of a screw-driver for adjustment. This nut is also provided with a cutaway portion 34 arranged in its outer periphery. The relief valve adjustment nut 24 is provided with a kerf 36 in its outer face and its outer periphery is cut away, as indicated at 37. When these nuts have been properly set, as will be later described, a lock member 38 is pushed into the bore and its arms 39 enter the cutaway portions 34 and 37 of the pressure and relief adjustments nuts and is held therein against rotation by a cotter pin 40, and in turn locks both nuts.

The cap 8' is provided with a nipple 41, and has its outer end threaded, as indicated at 43, and upon which is screwed an elbow coupling 44, to which is connected a copper pipe 44', leading behind the spring wheel and is connected to the valve stem 45 of the inner tube of the tire by means of a coupling 45'. This coupling is of such a structure as to unseat the Schrader valve carried by the stem, so that the tire has direct communication with the tank 8, and, therefore, both the tank and the tire will have the same air pressure therein. This will allow the coupling to be removed and the tire pumped up in the usual manner, in the event anything should happen to any of the mechanism of the device. Within the nipple 47 is arranged a ball valve 46, adapted to co-operate with the seat 47', so that, in the event of the tire blowing and there being no pressure in the pipe 44 leading from the tire, the rush of air from the tank 8 against the ball valve 46 would cause it to seat, and therefore, the air in the tank 8 and tank 1 would not be exhausted. This ball valve 46 will seat itself against the seat 46', in the event anything went wrong with the device, to allow the pressure to fall below the tire pressure and thus prevent the tire from becoming deflated.

In order to counterbalance the weight of the device, which, as shown, is on one side of the axle, I provide a block of metal 49, corresponding in weight to the housing 5', and thus form a perfectly balanced wheel.

The cap 8' is provided with a valve stem 50 having its inner end communicating with the tank 8, and carries a Schrader type valve 50'. By this arrangement it will be seen that the pressure of air in the tank 8 can be determined by the use of a gage.

In operation the tire is connected, as heretofore described, and the tank 1 is filled with air to any desired pressure. It is understood that this pressure will be considerably more than the pressure of the tire, so that the volume of air therein will be more than would be necessary to inflate the tire. The relief valve nut and pressure nut have to be so adjusted as to carry—say—35 pounds pressure in the tank 8, and, therefore, the same pressure in the tire. The pressure in the tank 8 holds the diaphragm 15 in the position shown in Figure 3 of the drawings. Should the tire leak, the pressure in the tank 8 would be reduced and the spring 23 would move the member 18 and the diaphragm 15 to the left (Figure 3) and the flat end of the member 18 would engage the valve stem 28 and allow the air to pass from the tank 1 to the tank 8. As soon as the pressure reaches 35 pounds, the diaphragm 15 would move the member 18 away from the valve stem 28 and the air is cut off. This takes place each time the air pressure in the tire and tank 8 is reduced. Should for any reason the valve 7 leak and build up a higher pressure in the tank 8, the diaphragm would be forced to the right until the valve stem 31 engages the relief nut 32 and air will escape from tank 8 until the pressure is lowered to 35 pounds, when the spring 23 would return the parts to the position shown in Figure 3.

While I have shown the tank 3 forming the brake drum, it will be understood that it could be attached to the hub, or to any part of the wheel.

Having thus described my invention, what I claim is:

1. A pressure regulating device for supplying fluid to a chamber, a high pressure tank, a low pressure tank, a Schrader type valve connection between said tanks, a Schrader valve in said low pressure tank, automatic means for operating the Schrader valve, a pipe connecting the low pressure tank to the chamber, and means within the pipe for shutting off the air from the low pressure tank when the air in the chamber is rapidly exhausted.

2. A pressure regulating device for supplying fluid to a chamber, a high pressure tank, a low pressure tank therein, a valve connection between the tanks, a pipe connection between the low pressure tank and the chamber, means in said pipe for shutting off the air from the low pressure tank when the air in the chamber is rapidly exhausted, a diaphragm controlled by the air in the low pressure tank and adapted to operate the valve between the tanks for maintaining the predetermined pressure in the low pressure tank, and a valve carried by the diaphragm and operated by the movement thereof for relieving any excess pressure in the low pressure tank.

3. A pressure regulating device for supplying fluid to a chamber, a high pressure tank, a low pressure tank, a valve connection between said tank, a relief valve in said low pressure tank, automatic means for operating the valve, an unobstructed pipe connecting the low pressure tank to the chamber, means within the pipe for shutting off the air from the low pressure tank when the air in the chamber is rapidly exhausted, and means for shutting off the air from the chamber to the tank should the air pressure of the tank fall below that of the chamber.

4. An automatic pressure regulating device for supplying fluid to a chamber, a high pressure tank, automatic means for maintaining a predetermined pressure in the chamber, an automatic valve to prevent undue pressure in the chamber, and an automatic valve to prevent the escape of air from the tank and the chamber in the event of the rapid exhausting of the air in either the tank or the chamber.

5. A pressure regulating device for supplying fluid to a chamber, a high pressure tank, a low pressure tank, a valve connection between said tanks, a valve in said low pressure tank, automatic means operated by air pressure for operating the last mentioned valve, an unobstructed pipe connecting the low pressure tank to the chamber under normal conditions, a single valve in said pipe normally held open and constructed to close said pipe and shut off the air from the low pressure tank when the air in the chamber is rapidly exhausted, and to operate in the opposite direction to close the pipe for shutting off the air from the chamber to the tank should the air pressure of the tank fall below that of the chamber.

6. A pressure regulating device for supplying fluid to a chamber, a high pressure air tank, a low pressure tank in the high pressure tank, means for supplying air from the low pressure tank to the chamber, means for maintaining a predetermined pressure in the low pressure tank, automatic means for relieving any excess pressure in the low pressure tank, automatic means for shutting off the air from the chamber to the tank should the air pressure in the tank fall below that of the chamber a pipe leading from the low pressure tank, a ball valve in said pipe and adapted to be closed by back pressure in the pipe when the pressure in the low pressure tank is greatly reduced.

7. A pressure regulating device for supplying fluid to a chamber, a high pressure tank, a low pressure tank communicating therewith and having automatic means for maintaining a predetermined pressure in the low pressure tank, automatic means for relieving any excess pressure in the low pressure tank, means whereby the high pressure tank and the low pressure tank may be supplied with air from the outside and the pressure thereof tested, automatic means for shutting off the air from the chamber to the tank should the air pressure in the tank fall below that of the chamber, a pipe leading from the low pressure tank, a ball valve in said pipe and adapted to be closed by back pressure in the pipe when the pressure in the low pressure tank is greatly reduced.

8. A pressure regulating device for supplying fluid to a chamber, a high pressure tank, a low pressure tank therein, a valve connection between the tanks, an unobstructed pipe connection between the low pressure tank and the chamber, means in said pipe for shutting off the air from the low pressure tank when the air in the chamber is rapidly exhausted, a diaphragm controlled by the air in the low pressure tank and adapted to operate the valve between the tanks for maintaining a predetermined pressure in the low pressure tank, a valve carried by the diaphragm and operated by the movement thereof for relieving any excess pressure in the low pressure tank, automatic means for shutting off the air from the chamber to the tank should the air pressure in the tank fall below that of the chamber, a pipe leading from the low pressure tank, a ball valve in said pipe and adapted to be closed by back pressure in the pipe when the pressure in the low pressure tank is greatly reduced.

J. HERVEY MANN, Jr.